(12) United States Patent
Whittle (10) Patent No.: US 10,145,429 B1
(45) Date of Patent: Dec. 4, 2018

(54) AIRCRAFT BRAKE TORQUE AND CLAMP FORCE REACTION THROUGH LANDING GEAR STRUCTURE

(71) Applicant: Goodrich Corporation, Charlotte, NC (US)

(72) Inventor: Scott Whittle, Springboro, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/699,719

(22) Filed: Sep. 8, 2017

(51) Int. Cl.
| | | |
|---|---|---|
| *F16D 55/36* | (2006.01) | |
| *F16D 65/00* | (2006.01) | |
| *F16D 65/78* | (2006.01) | |
| *F16D 55/00* | (2006.01) | |

(52) U.S. Cl.
CPC ......... *F16D 55/36* (2013.01); *F16D 65/0062* (2013.01); *F16D 65/78* (2013.01); *F16D 2055/0012* (2013.01)

(58) Field of Classification Search
USPC .............................................. 188/71.5, 71.6
See application file for complete search history.

(56) References Cited

U.S. PATENT DOCUMENTS

| | | | | |
|---|---|---|---|---|
| 3,845,919 A | * | 11/1974 | Jenny ..................... B64C 25/34 | 188/129 |
| 5,503,254 A | * | 4/1996 | Fisher .................... F16D 55/36 | 188/218 XL |
| 5,806,794 A | * | 9/1998 | Hrusch ................... B60T 1/065 | 244/110 A |
| 5,862,890 A | * | 1/1999 | Long ...................... F16D 55/36 | 188/71.5 |
| 5,944,147 A | * | 8/1999 | Berwanger ............. F16D 55/36 | 188/71.5 |
| 6,095,293 A | * | 8/2000 | Brundrett ............... F16D 55/36 | 188/18 A |
| 6,302,244 B1 | * | 10/2001 | Kernik .................... F16D 55/40 | 188/71.5 |
| 6,581,730 B1 | * | 6/2003 | Haydon ................. B60T 1/065 | 188/18 A |
| 6,615,958 B1 | * | 9/2003 | Baden .................... B64C 25/36 | 188/264 AA |
| 9,678,029 B2 | * | 6/2017 | Rateick ................. G01N 27/12 | |
| 2010/0106347 A1 | * | 4/2010 | Cahill .................... B60T 8/1703 | 701/3 |
| 2011/0156472 A1 | * | 6/2011 | Bucheton ............. B64C 25/405 | 301/6.2 |
| 2017/0267336 A1 | * | 9/2017 | Onfroy .................. B64C 25/44 | |

\* cited by examiner

*Primary Examiner* — Christopher P Schwartz
(74) *Attorney, Agent, or Firm* — Snell & Wilmer L.L.P.

(57) ABSTRACT

An aircraft wheel braking arrangement may comprise a landing gear structure, a torque tube extending in an outboard direction from the landing gear structure, and an actuator housing disposed outboard from the torque tube. An actuator piston may extend in an inboard direction from the actuator housing for applying a force to a brake stack surrounding the torque tube. In various embodiments, a back plate is non-integral to the torque tube and may be disposed inboard of an end plate of the brake stack or the landing gear structure itself may act as the back plate. The back plate and/or the end plate may provide a direct thermal path from the brake stack to a landing gear structure.

20 Claims, 5 Drawing Sheets

AIRCRAFT BRAKE TORQUE AND CLAMP FORCE REACTION THROUGH LANDING GEAR STRUCTURE

FIELD

The present disclosure relates to aircraft braking systems, and, more specifically, to systems and methods for torque, clamping, and thermal conduction paths for aircraft braking systems.

BACKGROUND

Aircraft often include one or more landing gear that comprise one or more wheels. A braking system is coupled to the wheel(s) in order to decelerate or park the aircraft. Aircraft brake torque is typically reacted either by a spline drive or bolted flange configuration that ties the torque plate to the aircraft axle or through a torque pin that extends from the landing gear structure which engages the brake piston housing. The foregoing configurations allow minimal heat conduction from the brake to the landing gear structure. Thermal conduction is currently limited to that which flows radially inward from the heat sink, through the torque plate, and into the mass of the aircraft axle.

SUMMARY

In various embodiments, an aircraft wheel braking arrangement is provided, comprising a landing gear structure, a torque tube extending in an outboard direction from the landing gear structure, and an actuator housing coupled to the torque tube, wherein the torque tube is disposed between the landing gear structure and the actuator housing.

In various embodiments, an inboard end of the torque tube engages the landing gear structure and an outboard end of the torque tube engages the actuator housing.

In various embodiments, the aircraft wheel braking arrangement further comprises a brake stack disposed between the actuator housing and the landing gear structure.

In various embodiments, the torque tube is in mechanical communication with the brake stack and is configured to transfer torque from the brake stack to the landing gear structure.

In various embodiments, the torque tube is in thermal communication with the brake stack and is configured to transfer heat from the brake stack to the landing gear structure.

In various embodiments, the brake stack is configured to transfer heat to the landing gear structure.

In various embodiments, the aircraft wheel braking arrangement further comprises an axle disposed at least partially within the torque tube, and a wheel disposed radially outward from the actuator housing.

In various embodiments, the aircraft wheel braking arrangement further comprises a bearing system disposed between the axle and the wheel.

In various embodiments, the aircraft wheel braking arrangement further comprises an actuator extending from the actuator housing, and a heat shield coupled to the actuator and disposed between the brake stack and the actuator housing.

In various embodiments, the aircraft wheel braking arrangement further comprises a back plate coupled between the landing gear structure and the brake stack.

An aircraft wheel braking arrangement is provided, comprising a landing gear structure, a brake stack disposed outboard from the landing gear structure, an actuator housing disposed outboard from the brake stack, and an actuator extending in an inboard direction from the actuator housing and configured to apply a force to the brake stack.

In various embodiments, the aircraft wheel braking arrangement further comprises a back plate coupled between the landing gear structure and the brake stack.

In various embodiments, the back plate provides dampening of movement of the brake stack relative to the landing gear structure.

In various embodiments, the back plate is floating between the brake stack and the landing gear structure.

In various embodiments, the back plate provides a thermal path between the brake stack and the landing gear structure.

In various embodiments, the aircraft wheel braking arrangement further comprises a torque tube extending in an outboard direction from the landing gear structure and coupled to the brake stack.

In various embodiments, the aircraft wheel braking arrangement further comprises a back plate coupled between the landing gear structure and the brake stack, wherein the back plate is detached from the torque tube.

In various embodiments, the aircraft wheel braking arrangement further comprises an axle, and a fastener coupled to the axle, wherein at least one of the torque tube and the actuator housing are compressed between the landing gear structure and the fastener.

In various embodiments, the aircraft wheel braking arrangement further comprises a heat shield coupled to the actuator and disposed between the brake stack and the actuator housing.

A method of assembling an aircraft wheel braking arrangement is provided, comprising positioning a brake stack to surround a torque tube, and positioning an actuator housing relative to the brake stake such that the actuator housing is disposed outboard from the brake stack.

In various embodiments, the method further comprises positioning a back plate between a landing gear structure and an end plate of the brake stack.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

During braking, the brakes of an aircraft convert kinetic energy into heat. This heat may cause aircraft brakes to rise to high temperatures, such as well over 1500° F. (815° C.), for example after landing and/or a rejected take off. Aircraft brake hardware thus may be sized and configured to accommodate such thermal loads. The landing gear of an aircraft may have a large thermal capacity. Accordingly, in various embodiments, an aircraft brake may be configured to transfer heat to an aircraft landing gear structure (e.g., a landing gear bogie and/or a shock strut). In various embodiments, as heat is transferred to the landing gear, other aircraft brake components may be sized and configured so as to accommodate reduced thermal loads, resulting, in various embodiments, to aircraft brakes having, for example, reduced weight, number of parts, and/or complexity, among other things.

During braking, vibration modes may develop in the brake stack and further excite vibration modes in the landing gear structure. By moving the end plate feature of the brake to the landing gear it is possible decouple axial and whirl brake stack vibration modes to the benefit of aircraft braking performance and weight reduction of the landing gear structure.

Figure 1:
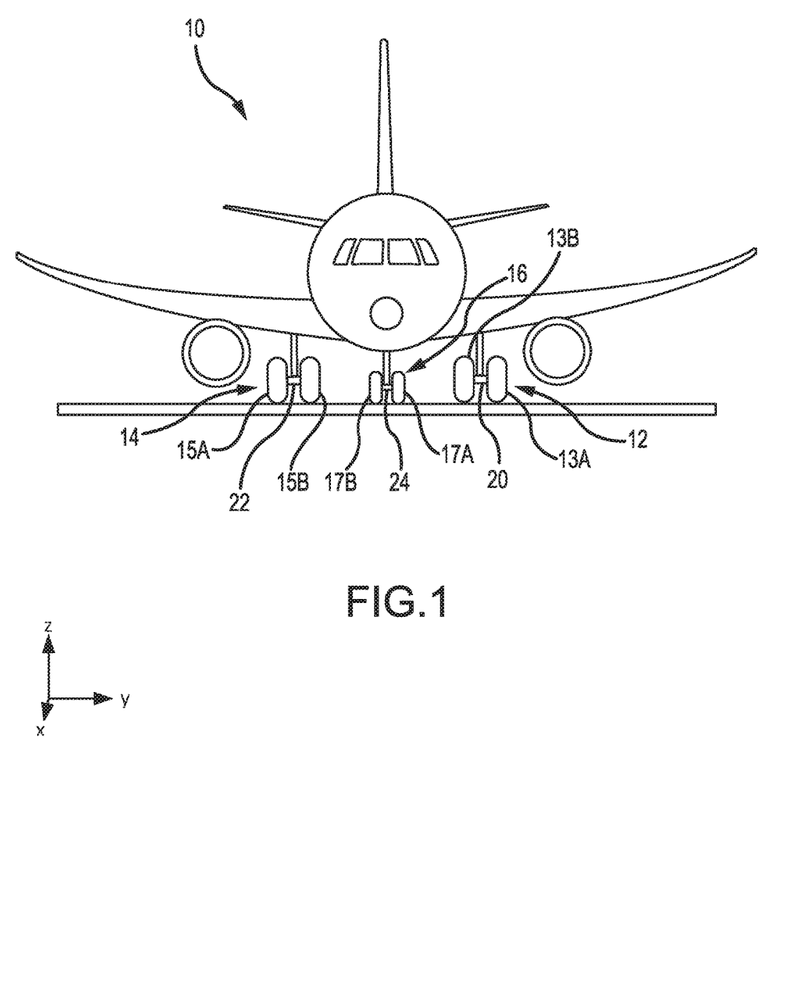
FIG. 1 illustrates an aircraft, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used throughout the drawings to illustrate the axial (y), forward (x) and vertical (z) directions relative to axle 22.

Figure 2:
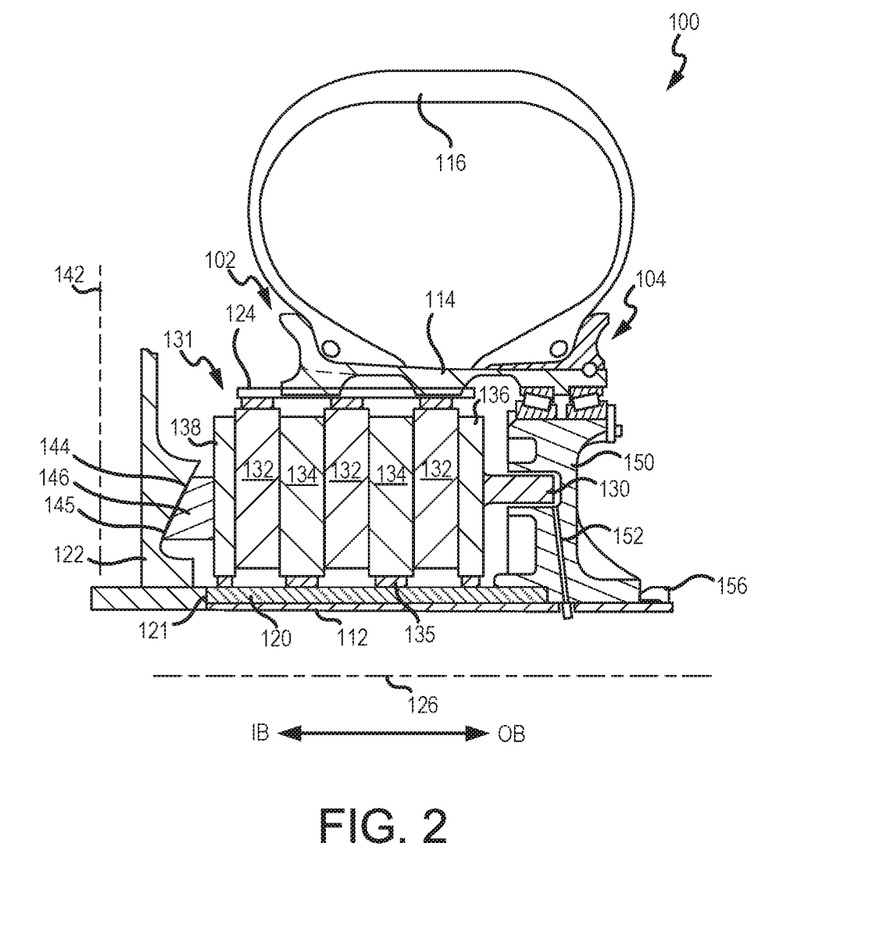
FIG. 2 illustrates an aircraft wheel braking arrangement having a wheel that rotates about a brake actuator housing and having a brake stack interfacing a torque tube, in accordance with various embodiments.

With reference to FIG. 2, aircraft wheel braking arrangement 100, such as may be found on an aircraft in accordance with various embodiments, is illustrated. Aircraft wheel braking arrangement 100 may, for example, comprise a bogie axle (axle) 112, a wheel 114, a tire 116, one or more torque bars 124, a torque tube 120, a wheel rotational axis 126, an actuator housing 150, an actuator 130, multiple brake rotors 132, multiple brake stators 134, a pressure plate 136, and an end plate 138. Multiple brake rotors 132, multiple brake stators 134, pressure plate 136, and end plate 138 may be collectively referred to herein as a brake stack 131. Axle 112 may extend from a landing gear structure 122. In various embodiments, landing gear structure 122 may comprise, for example, a landing gear bogie, a shock strut, or any other landing gear structure suitable for interfacing to brake stack 131.

Brake disks (e.g., interleaved rotors 32 and stators 34) may be disposed surrounding torque tube 120 and between landing gear structure 122 and actuator 130. Torque bars 124 may be secured to wheel 114. Rotors 32 may be secured to torque bars 124 for rotation with wheel 114, while stators 134 may be engaged with torque tube 120. In this regard, torque tube 120 may be in mechanical engagement with brake stack 131 and configured to transfer torque from brake stack 131 to landing gear structure 122. For example, splines extending from torque tube 120 may interface with brake stack 131. At least one actuator 130 may be operable to compress interleaved rotors 132 and stators 134 for stopping the aircraft. In the illustrated embodiment, actuator 130 is shown as a hydraulically actuated piston, but many types of actuators are suitable, such as an electromechanical actuator. Pressure plate 136 and end plate 138 may be disposed at opposite ends of the interleaved rotors 132 and stators 134. Rotors 132 and stators 134 may comprise any material suitable for friction disks, including ceramics or carbon materials, such as a carbon/carbon composite.

Through compression of interleaved rotors 132 and stators 134 between pressure plates 136 and end plate 138, the resulting frictional contact slows rotation of wheel 114. Torque tube 120 may be secured to a stationary portion of the landing gear arrangement such as landing gear structure 122 such that torque tube 120 and stators 134 are prevented from rotating during braking of the aircraft.

In various embodiments, brake stack 131 may be coupled between landing gear structure 122 and actuator 130. A back plate 146 may be disposed between end plate 138 and landing gear structure 122. Back plate 146 may engage a mating surface 144 of landing gear structure 122. Mating surface 144 may be oriented at an angle relative to landing gear structure centerline 142, such as an angle of between 1 degree and 80 degrees, and in various embodiments, at an angle of between 5 degrees and 50 degrees, and in various embodiments, at an angle of between 10 degrees and 40 degrees. An inboard surface 145 of back plate 146 may be shaped to be complementary to the geometry of mating surface 144. Back plate 146 may act as a damper for brake stack 131. Stated differently, back plate 146 may dampen movement of brake stack 131 relative to landing gear structure 122. For example, back plate 146 may slide relative to mating surface 144 to dampen movement of brake stack 131 relative to landing gear structure 122 and vice versa. In this regard, back plate 146 may be floating between landing gear structure 122 and brake stack 131. Stated differently back plate 146 may be non-integral to and detached from torque tube 120, thereby decoupling the axial and whirl vibration modes of brake stack 131.

Brake stack 131 may operate as a heat sink to absorb large amounts of kinetic energy converted to heat during slowing of the aircraft. Back plate 146 may provide a thermal path between landing gear structure 122 and brake stack 131. In various embodiments, back plate 146 may be omitted and end plate 138 may directly engage landing gear structure 122. Thus, end plate 138 may provide a direct thermal path to landing gear structure 122, in accordance with various embodiments. Furthermore, torque tube 120 may provide a thermal path from brake stack 131 to landing gear structure 122. For example, an inboard surface 121 of torque tube 120 may engage landing gear structure 122.

Torque tube 120 may extend in the inboard direction from actuator housing 150. In this regard, actuator housing 150 may be disposed outboard from brake stack 131. Brake stack 131 may be disposed outboard from landing gear structure 122. Actuator housing 150 may define a fluid chamber 152 whereby a fluid, such as hydraulic fluid for example, may apply pressure to actuator 130, thereby causing actuator 130 to move in the inboard direction and apply a force on brake stack 131.

In various embodiments, wheel 114 may circumferentially surround actuator housing 150. Brake stack 131 may be axially aligned with inboard side 102 of wheel 114, while outboard side 104 of wheel 114 may be axially aligned with actuator housing 150. In various embodiments, torque tube 120 and actuator housing 150 may be axially compressed between landing gear structure 122 and a fastener 156. In various embodiments, fastener 156 may comprise a nut threadingly attached to axle 112.

Figure 3:
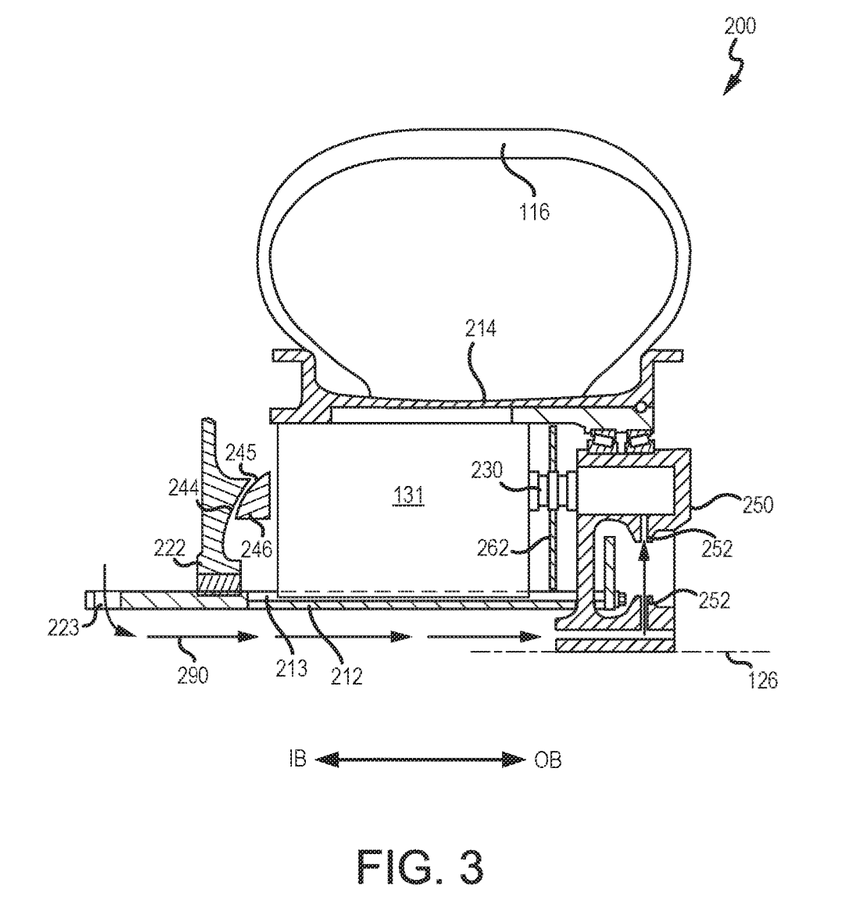
FIG. 3 illustrates an aircraft wheel braking arrangement having a wheel that rotates about a brake actuator housing and having a brake stack interfacing a splined axle, in accordance with various embodiments.

With respect to FIG. 3, elements with like element numbering, as depicted in FIG. 2, are intended to be the same and will not necessarily be repeated for the sake of clarity.

With reference to FIG. 3, an aircraft wheel braking arrangement 200 is illustrated, in accordance with various embodiments. In various embodiments, aircraft wheel braking arrangement 100 may be similar to aircraft wheel braking arrangement 200, with momentary reference to FIG. 2. A wheel 214 may be mounted to an actuator housing 250. Actuator housing 250 may be coupled to axle 212, such as for example via a spline fitting and/or a fastener such as a bolt. In this regard, a portion of actuator housing 250 may extend into axle 212. Fluid chamber 252, defined by actuator housing 250 may route fluid from within axle 212 to actuator 230. For example, a hydraulic fluid path 290 may be defined by an aperture 223 disposed in landing gear structure 222 and actuator housing 250. In various embodiments, a conduit may be routed through axle 212 from aperture 223 to actuator housing 250. In various embodiments, axle 212 may at least partially define hydraulic fluid path 290.

A back plate 246 may be disposed between brake stack 131 and landing gear structure 222. Back plate 246 may engage a mating surface 244 of landing gear structure 222. An inboard surface 245 of back plate 246 may be shaped to be complementary to the geometry of mating surface 244. In various embodiments, mating surface 244 may be curved. In various embodiments, inboard surface 245 may be curved.

As previously mentioned, brake stack 131 may operate as a heat sink to absorb large amounts of kinetic energy converted to heat during slowing of the aircraft. A heat shield 262 may be disposed between brake stack 131 and actuator housing 250. Heat shield 262 may be coupled to actuator 230. Heat shield 262 may prevent heat from brake stack 131 from being radiated in the outboard direction.

In various embodiments, brake stack 131 may be mounted to axle 212. Axle 212 may comprise a plurality of splines 213. In this regard, brake stack 131 may be coupled to axle 212 via a spline connection. Splines 213 may prevent brake stack 131 from rotating relative to axle 212. In various embodiments, axle 212 may be removeably coupled to landing gear structure 222. In this regard, axle 212 may be replaceable without disassembling landing gear components from landing gear structure 222.

Figure 4:
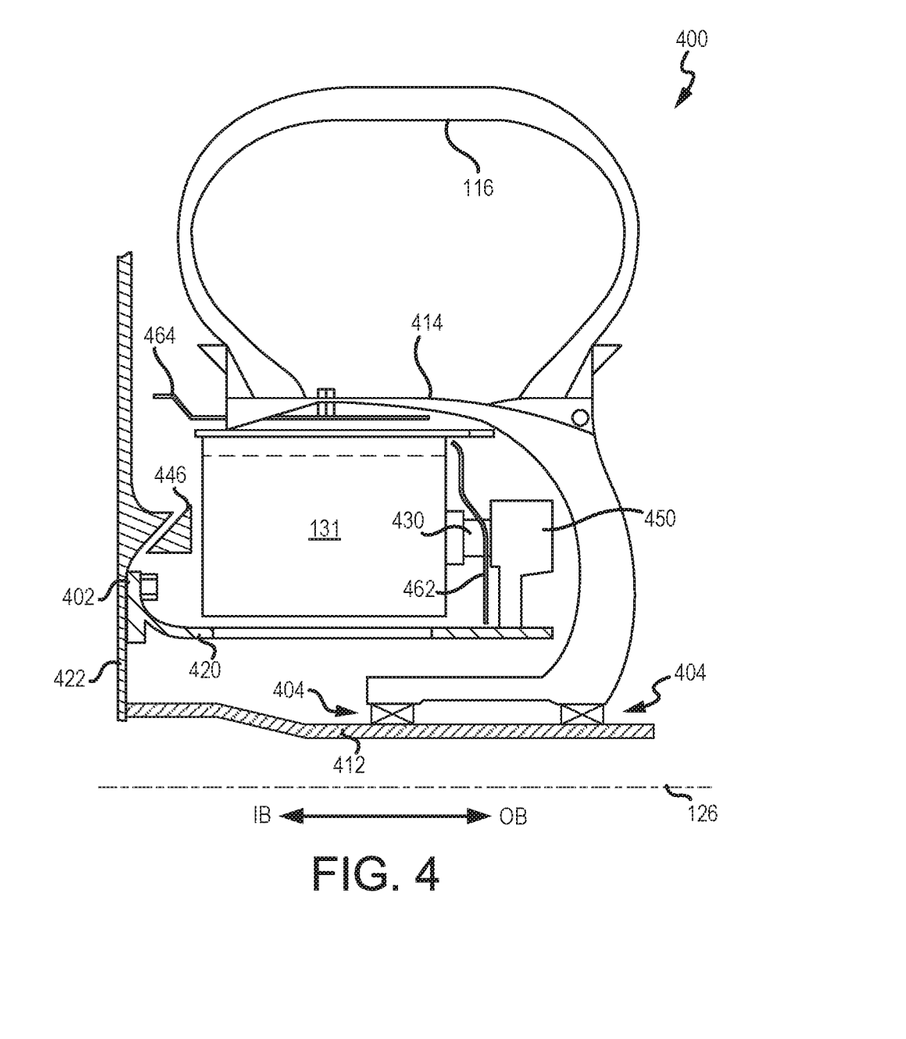
FIG. 4 illustrates an aircraft wheel braking arrangement having a wheel that rotates about a landing gear axle, in accordance with various embodiments.

With respect to FIG. 4, elements with like element numbering, as depicted in FIG. 2, are intended to be the same and will not necessarily be repeated for the sake of clarity.

With reference to FIG. 4, an aircraft wheel braking arrangement 400 is illustrated, in accordance with various embodiments. In various embodiments, aircraft wheel braking arrangement 100 may be similar to aircraft wheel braking arrangement 400, with momentary reference to FIG. 2. Aircraft wheel braking arrangement 400 may include wheel 414, actuator housing 450, axle 412, landing gear structure 422, and torque tube 420. Wheel 414 may be coupled to axle 412. A bearing system 404 may be coupled between axle 412 and wheel 414. Torque tube 420 may surround axle 412. Torque tube 420 may comprise a flange 402 disposed on the inboard end of torque tube 420. Flange 402 may be fastened to landing gear structure 422. Actuator housing 450 may be mounted to torque tube 420. Back plate 446 may be disposed between landing gear structure 222 and brake stack 131. Back plate 446 may be disposed between landing gear structure 422 and brake stack 131.

In various embodiments, actuator 430 may extend from actuator housing 450. Heat shield 462 may be mounted to actuator 430. Heat shield 464 may be coupled to wheel 414. Heat shield 464 may be disposed between brake stack 131 and wheel 414. Heat shield 464 may extend in the inboard direction from wheel 414. Heat shield 464 may extend between wheel 414 and landing gear structure 422. In this regard, heat shield 464 may prevent heat from being radiated to tire 116.

Figure 5A:
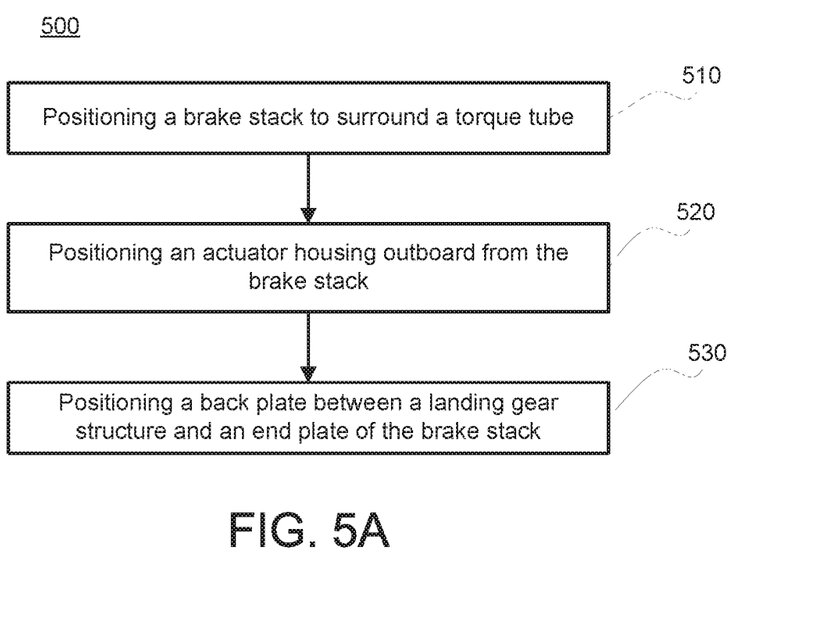
FIG. 5A illustrates a method of assembling an aircraft wheel braking arrangement, in accordance with various embodiments.

With reference to FIG. 5A, a method 500 for assembling an aircraft wheel braking arrangement is provided, in accordance with various embodiments. Method 500 includes positioning a brake stack to surround a torque tube (step 510). Method 500 includes positioning an actuator housing outboard from the brake stack (step 520). Method 500 includes positioning a back plate between a landing gear structure and an end plate of the brake stack (step 530).

With combined reference to FIG. 2 and FIG. 5A, step 510 may include positioning brake stack 131 to surround torque tube 120. Step 520 may include positioning actuator housing 150 outboard from brake stack 131. Step 530 may include positioning back plate 146 between landing gear structure 122 and end plate 138.

Figure 5B:
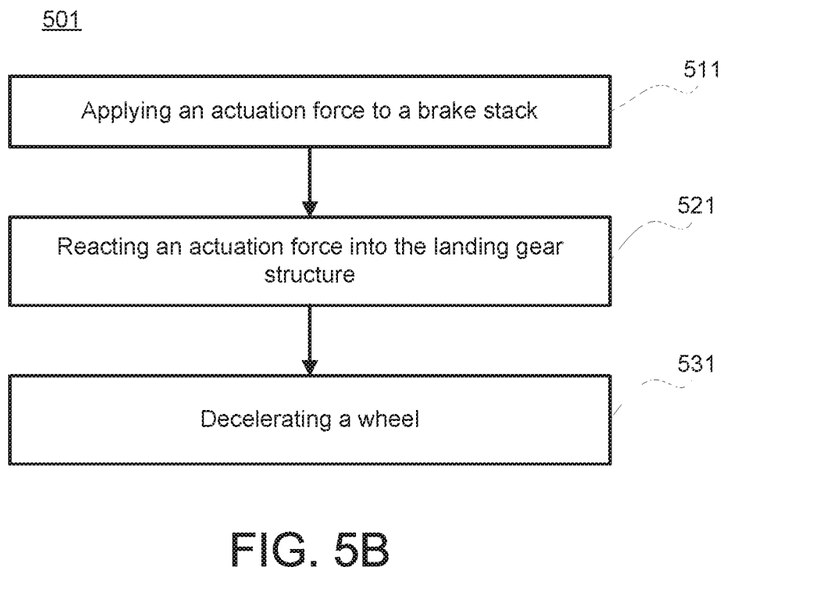
FIG. 5B illustrates a method of braking, in accordance with various embodiments.

With reference to FIG. 5B, a method 501 for braking is provided, in accordance with various embodiments. Method 501 includes applying an actuation force to a brake stack (step 511). Method 501 includes reacting the actuation force into a landing gear structure (step 521). Method 501 includes decelerating a wheel (step 531).

With combined reference to FIG. 2 and FIG. 5B, step 511 may include applying, by actuator 130, an actuation force to brake stack 131. Step 521 may include reacting the actuation force into landing gear structure 122. Step 531 may include decelerating wheel 114 in response to the actuation force being reacted by landing gear structure 122.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft wheel braking arrangement, comprising:
a landing gear structure;
a torque tube extending in a first direction from the landing gear structure;
an actuator housing coupled to the torque tube, wherein the torque tube is disposed between the landing gear structure and the actuator housing; and
a brake stack disposed in the first direction from the landing gear structure and between the actuator housing and the landing gear structure.

2. The aircraft wheel braking arrangement of claim 1, further comprising:
an axle disposed at least partially within the torque tube; and
a wheel disposed radially outward from the actuator housing.

3. The aircraft wheel braking arrangement of claim 2, further comprising a bearing system disposed between the axle and the wheel.

4. The aircraft wheel braking arrangement of claim 1, wherein the torque tube is in mechanical communication with the brake stack and is configured to transfer torque from the brake stack to the landing gear structure.

5. The aircraft wheel braking arrangement of claim 1, wherein the torque tube is in thermal communication with the brake stack and is configured to transfer heat from the brake stack to the landing gear structure.

6. The aircraft wheel braking arrangement of claim 1, wherein the brake stack is configured to transfer heat to the landing gear structure.

7. The aircraft wheel braking arrangement of claim 1, wherein a first end of the torque tube engages the landing gear structure and a second end of the torque tube engages the actuator housing.

8. The aircraft wheel braking arrangement of claim 1, wherein the landing gear structure comprises at least one of a landing gear bogie or a shock strut.

9. The aircraft wheel braking arrangement of claim 1, further comprising:
an actuator extending in a second direction towards the brake stack from the actuator housing; and
a heat shield coupled to the actuator and disposed between the brake stack and the actuator housing.

10. The aircraft wheel braking arrangement of claim 1, further comprising a back plate coupled between the landing gear structure and the brake stack.

11. An aircraft wheel braking arrangement, comprising:
a landing gear structure;
a brake stack disposed in a first direction from the landing gear structure;
an actuator housing disposed in the first direction from the brake stack; and
an actuator extending in a second direction from the actuator housing and configured to apply a force to the brake stack,
wherein the second direction is opposite from the first direction.

12. The aircraft wheel braking arrangement of claim 11, further comprising a back plate coupled between the landing gear structure and the brake stack, wherein the back plate provides dampening of movement of the brake stack relative to the landing gear structure.

13. The aircraft wheel braking arrangement of claim 11, further comprising a back plate coupled between the landing gear structure and the brake stack, wherein the back plate is floating between the brake stack and the landing gear structure.

14. The aircraft wheel braking arrangement of claim 11, further comprising a back plate coupled between the landing gear structure and the brake stack, wherein the back plate provides a thermal path between the brake stack and the landing gear structure.

15. The aircraft wheel braking arrangement of claim 11, further comprising a torque tube extending in the first direction from the landing gear structure and coupled to the brake stack.

16. The aircraft wheel braking arrangement of claim 15, further comprising a back plate coupled between the landing gear structure and the brake stack, wherein the back plate is detached from the torque tube.

17. The aircraft wheel braking arrangement of claim 15, further comprising:
- an axle; and
- a fastener coupled to the axle, wherein at least one of the torque tube and the actuator housing are compressed between the landing gear structure and the fastener.

18. The aircraft wheel braking arrangement of claim 11, further comprising a heat shield coupled to the actuator and disposed between the brake stack and the actuator housing.

19. A method of assembling an aircraft wheel braking arrangement, comprising:
- positioning a brake stack to surround a torque tube comprising a centerline axis, wherein the torque tube extends in a first axial direction from a landing gear structure; and
- positioning an actuator housing relative to the brake stake such that the actuator housing is disposed in the first axial direction from the brake stack.

20. The method of claim 19, further comprising positioning a back plate between the landing gear structure and an end plate of the brake stack.

* * * * *